United States Patent [19]
Voellmer

[11] Patent Number: 5,184,861
[45] Date of Patent: Feb. 9, 1993

[54] SPLIT RAIL GRIPPER ASSEMBLY AND TOOL DRIVER THEREFOR

[75] Inventor: George M. Voellmer, Takoma Park, Md.

[73] Assignee: The United States of America as represented by the Administrator, National Aeronautics & Space Administration, Washington, D.C.

[21] Appl. No.: 938,577

[22] Filed: Sep. 2, 1992

Related U.S. Application Data

[63] Continuation-in-part of Ser. No. 656,924, Feb. 15, 1991, abandoned.

[51] Int. Cl.⁵ .................................................. B25J 15/08
[52] U.S. Cl. ................................... 294/119.1; 901/41; 294/907
[58] Field of Search ................ 294/119.1, 902, 907; 901/41, 38, 46

[56] References Cited

U.S. PATENT DOCUMENTS

| | | |
|---|---|---|
| 4,579,380 | 4/1986 | Zaremsky et al. ............ 294/119.1 |
| 4,621,533 | 11/1986 | Gindy . |
| 4,707,013 | 11/1987 | Vranish et al. ............... 294/119.1 |
| 4,715,773 | 12/1987 | Parker et al. . |
| 4,741,568 | 5/1988 | Borcea et al. . |
| 4,784,421 | 11/1988 | Alvité294 ....................... 119.1 X/ |
| 4,821,584 | 4/1989 | Lembke . |
| 4,823,618 | 4/1989 | Ramming . |
| 4,874,194 | 10/1989 | Barrea et al. ............ 294/119.1 X |
| 4,913,481 | 4/1990 | Chin et al. . |
| 4,955,653 | 9/1990 | Beals . |
| 5,098,145 | 3/1992 | Goldberg et al. ............ 294/119.1 |

FOREIGN PATENT DOCUMENTS 3419187 11/1985 Fed. Rep. of Germany ... 294/119.1

Primary Examiner—Russell D. Stormer
Assistant Examiner—Joseph D. Pape
Attorney, Agent, or Firm—Paul S. Clohan, Jr.; R. Dennis Marchant; Guy M. Miller

[57] ABSTRACT

A split rail gripper for robotic apparatus and including a pair of rails which are driven in mutually opposite directions by a rack and pinion gear mechanism. Each rail includes a set of rack gear teeth which engage respective pinion gears and where the top rail engaging one of the pinion gears is driven by a harmonic gear reduction drive and motor unit coupled to an drive screw. The other pinion gear is driven by the top pinion gear engaging a set of rack gear teeth included in the bottom rail. As the top rail is driven in or out, the upper pinion gear is rotated, causing the other pinion gear, in turn, to rotate in the opposite direction. This causes the bottom rail to move in an opposite linear direction relative to the top rail. An outwardly extending gripper finger assembly is attached to respective ends of the rails, with each gripper finger including an arrangement of vertically and horizontally mounted roller members which operate to automatically center and engage an H-plate type interface secured to the object being grasped. The gripper assembly also includes a base plate attached to an interface plate of a robotic tool changer mechanism. A retractable rotary tool driver and tool is also centrally mounted on the base plate.

19 Claims, 5 Drawing Sheets

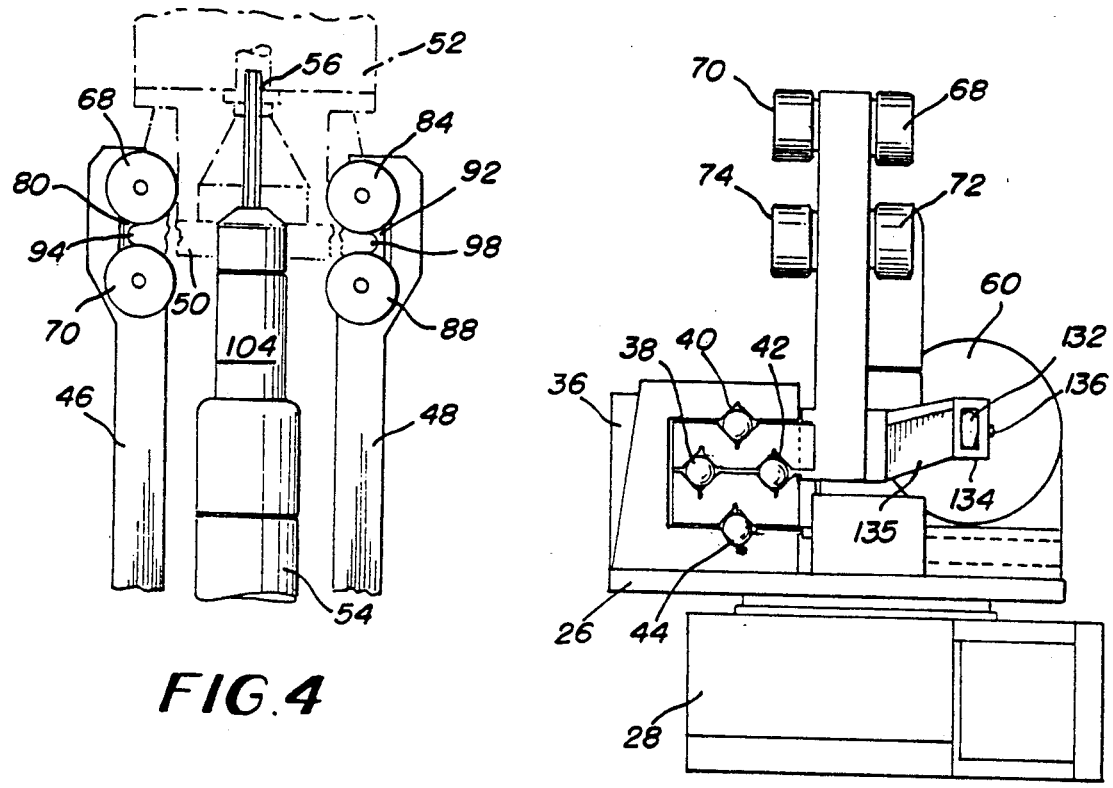
FIG. 4
FIG. 5
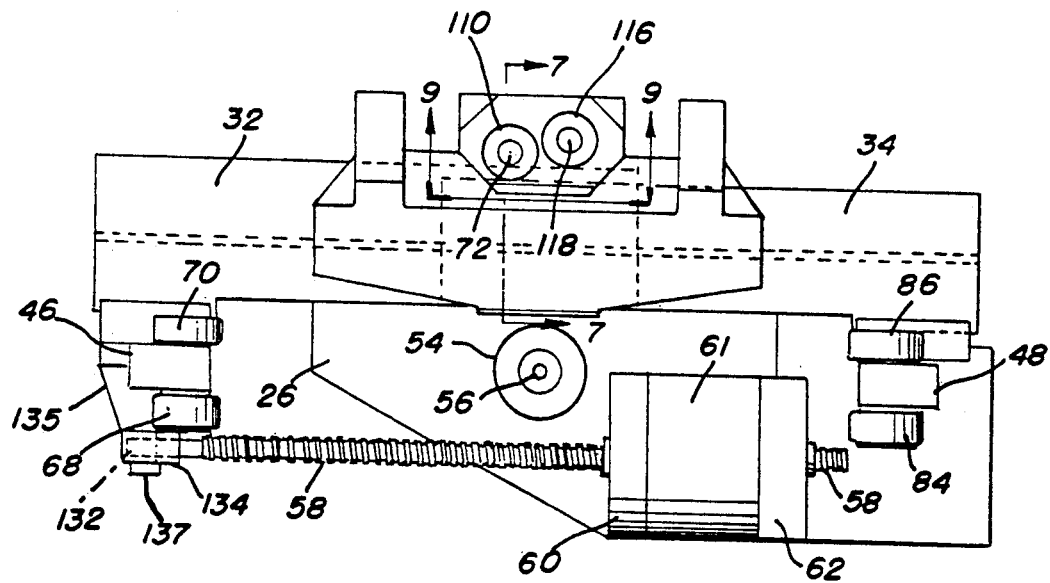
FIG. 6

SPLIT RAIL GRIPPER ASSEMBLY AND TOOL DRIVER THEREFOR

ORIGIN OF THE INVENTION

This invention was made by an employee of the U.S. Government and accordingly may be manufactured and used by or for the Government for governmental purposes without the payment of any royalties thereon or therefor.

This application is a continuation-in-part of application Ser. No. 07/656,924, filed Feb. 15, 1991, now abandoned.

FIELD OF THE INVENTION

The present invention relates generally to robotics and more particularly to apparatus for robotically gripping objects, for example, in zero gravity environments and to operate a retractable rotary tool.

BACKGROUND OF THE INVENTION

Where there is a need to position and remotely control machinery with a high degree of precision, robots are often used to perform these tasks. Robots in the past have been utilized to perform both simple and complex tasks in various environments, particularly where human activity is inaccessible, prohibited or relatively hazardous. More recently robotic type apparatus has been put to use in outer space. Typically where such robots are used, either tools or end-effectors are attached to movable robot arms so that objects can be grasped, lifted, manipulated and otherwise operated upon.

One known type of end-effector comprises a gripper comprised of two mutually opposing jaws that are movable with respect to one another in opposite directions by a rack and pinion gear mechanism. Such apparatus is shown, for example, in U.S. Pat. No. 4,707,013 issued to John Vranish et al on Nov. 17, 1987, and which is herein meant to be incorporated by reference. There the gripper includes a pair of rails having parallel thrown motion with a gripper finger sub-assembly attached to opposite ends of each rail. A pair of preloaded linear bearings engage the outward surfaces of each rail and two roller bearings spaced on either side of a pinion, all mounted on a common pinion shaft, engage the inward sidewalls of each rail. The rails are typically driven by an electric motor.

Further, the gripper design as disclosed in U.S. Pat. No. 4,707,013 incorporates separate racks that need to be first fabricated and then bolted to the rails, increasing the weight and bulk and making it relatively complicated to assemble. In order to achieve sufficient strength in the pinion shaft bearing, moreover, the back of the gripper housing protrudes significantly, further adding to the weight and bulk of the gripper. Also, when the fingers experience a sideload, the rails tend to move sideways relative to one another. Because the ends of the other sides of the rails are fixed, it has the effect of spreading the housing, eventually bending it open, causing preload on the bearings to be lost.

Strain gauges are also mounted on the fingers to sense gripper pressure, with service loops connecting to the gripper base. The service loops being subject to many cycles of flexing, have a tendency to snag on other parts of the gripper. Moreover, finger mounted strain gauges are easily damaged, if the part being gripped is inadvertently gripped on the finger shanks. Furthermore, strain gauges require individual calibration for each set of fingers to obtain reliable readings since each mounting situation is relatively different and the fingers vary slightly from element to element. Also, finger mounted strain gauges are sensitive to loads other than the finger grip force such as sideloads.

It should also be noted that rotary tools, particularly those mounted on robot end-effectors, are generally not retractable and fully protrude into the work space and as a result, generally require an actuator to release them.

SUMMARY

Accordingly, it is an object of the present invention to provide an improvement in robotic apparatus.

It is another object of the invention to provide an improvement in a robotic gripper which is operable in a zero gravity environment.

It is a further object of the invention to provide an improvement in split rail robotic gripper apparatus for operation in outer space.

And yet another object of the invention is to provide an improved split rail robotic gripper which is fitted with a retractable rotary tool for operating on a workpiece being gripped.

Briefly, the foregoing and other objects are achieved by a split rail gripper comprised of a pair of rails which are driven in mutually opposite directions by a rack and pinion gear mechanism, wherein each rail includes a set of rack gear teeth which engage respective pinion gears and where the top rail engaging one of the pinion gears is driven by a harmonic drive and motor unit coupled to a drive screw. The other pinion gear is driven by the top pinion gear and engages the set of rack gear teeth included in the bottom rail. As the top rail is moved in or out by the drive unit, the upper pinion gear is rotated, causing the other pinion gear, in turn, to rotate in the opposite direction. This causes the bottom rail to move in an opposite linear direction relative to the top rail. An outwardly extending finger assembly is attached to respective ends of the rails, with each finger comprising an arrangement of vertically and horizontally mounted roller members which operate to automatically center and engage an H plate type interface secured to the object being grasped. The gripper assembly also includes a base plate attached to an interface plate of a robotic tool changer mechanism. A retractable rotary tool driver and tool is centrally mounted on the base plate.

BRIEF DESCRIPTION OF THE DRAWINGS

Other features, advantages, and objectives of the invention will be more readily apparent when the following detailed description of the invention is considered in conjunction with the accompanying drawings, wherein:

FIG. 4 is a partial front plan view illustrating the gripper fingers engaging a workpiece and with the retractable tool holder and tool shown in FIG. 1 extended into the workpiece;

FIG. 5 is an end plan view of the embodiment shown in FIG. 1;

FIG. 6 is a top plan view further illustrative of the embodiment shown in FIG. 1;

DETAILED DESCRIPTION OF THE INVENTION

Figure 1:
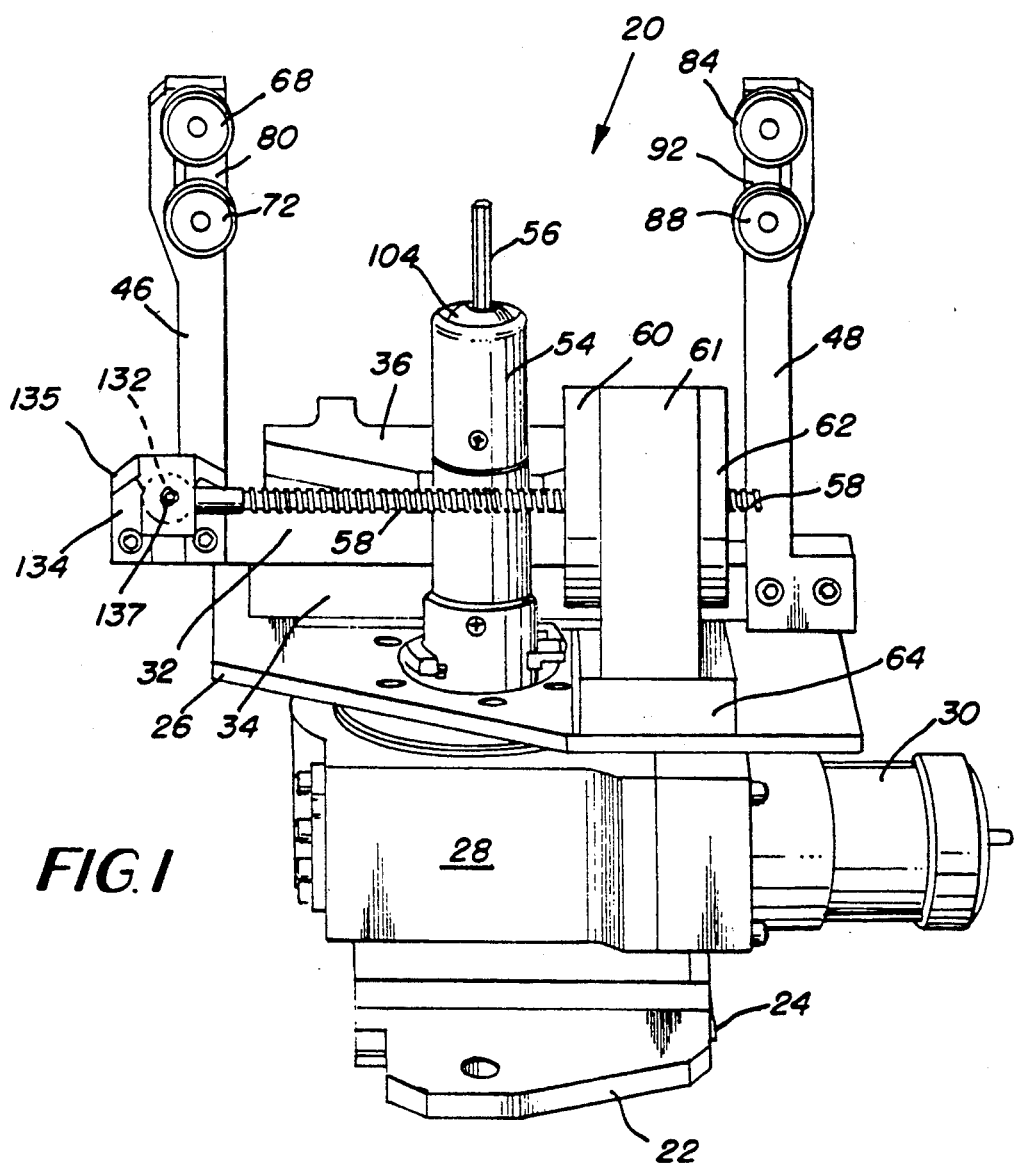
FIG. 1 is a perspective view generally illustrative of the split rail gripper in accordance with the preferred embodiment of the invention.

Referring now to the drawings wherein like references numerals refer to like components throughout, reference is first made to FIG. 1 where there is shown what is considered to be the preferred embodiment of the invention and wherein reference numeral 20 denotes a gripper and tool driving assembly which is adapted to be grasped by a robotic arm, not shown, via an interface plate 22 of a robotic tool changer mechanism, not shown. Such a tool changer mechanism, however, is disclosed in U.S. Ser. No. 07/608,657, entitled, "Robotic Tool Change Mechanism", which was filed on behalf of the present inventor on Nov. 2, 1990, and which is also intended to be incorporated herein by reference. On the rear edge of the interface plate 22 there is an electrical connector 24 which is also adapted to be connected to the robotic arm to which the gripper assembly 20 is attached.

Figure 7:
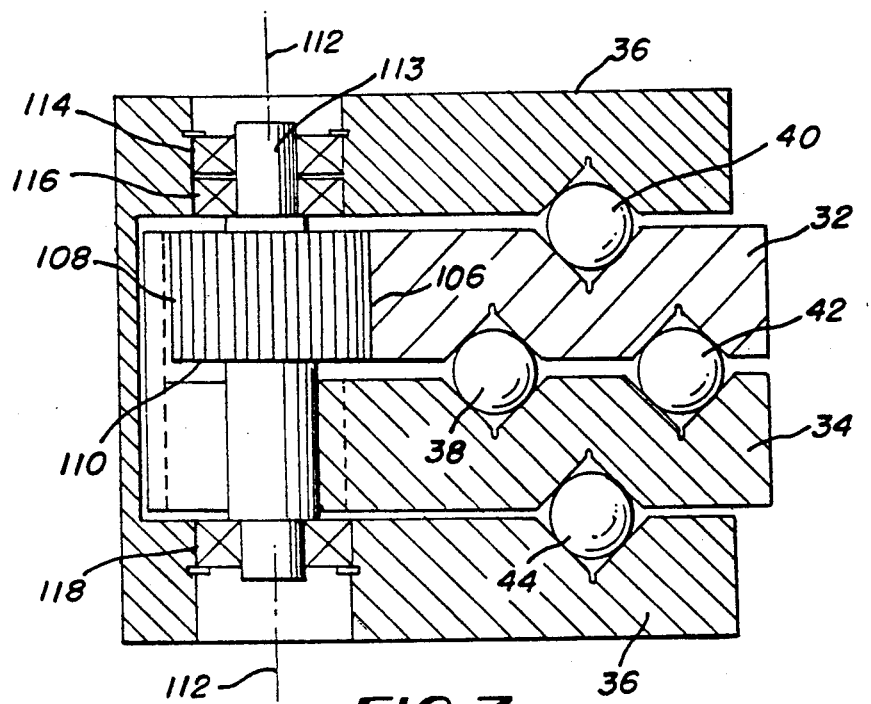
FIG. 7 is a sectional view taken along the lines 7—7 of FIG. 6 and being illustrative of the bearing configuration between the top and bottom rails.

The gripper assembly is primarily comprised of a baseplate 26 which is mounted on a tool motor drive assembly 28 secured to the interface plate 22 and including electrical drive motor 30 extending out to one side. The gripper itself is comprised of two elongated rails, namely a top rail 32 and a bottom rail 34, which are operable to extend partially out of a housing 36 and being mutually separated by four crossed roller bearings, which is shown by reference numerals 38, 40, 42 and 44 as shown in FIGS. 5 and 7 and which will be discussed in further detail subsequently.

Figure 3:
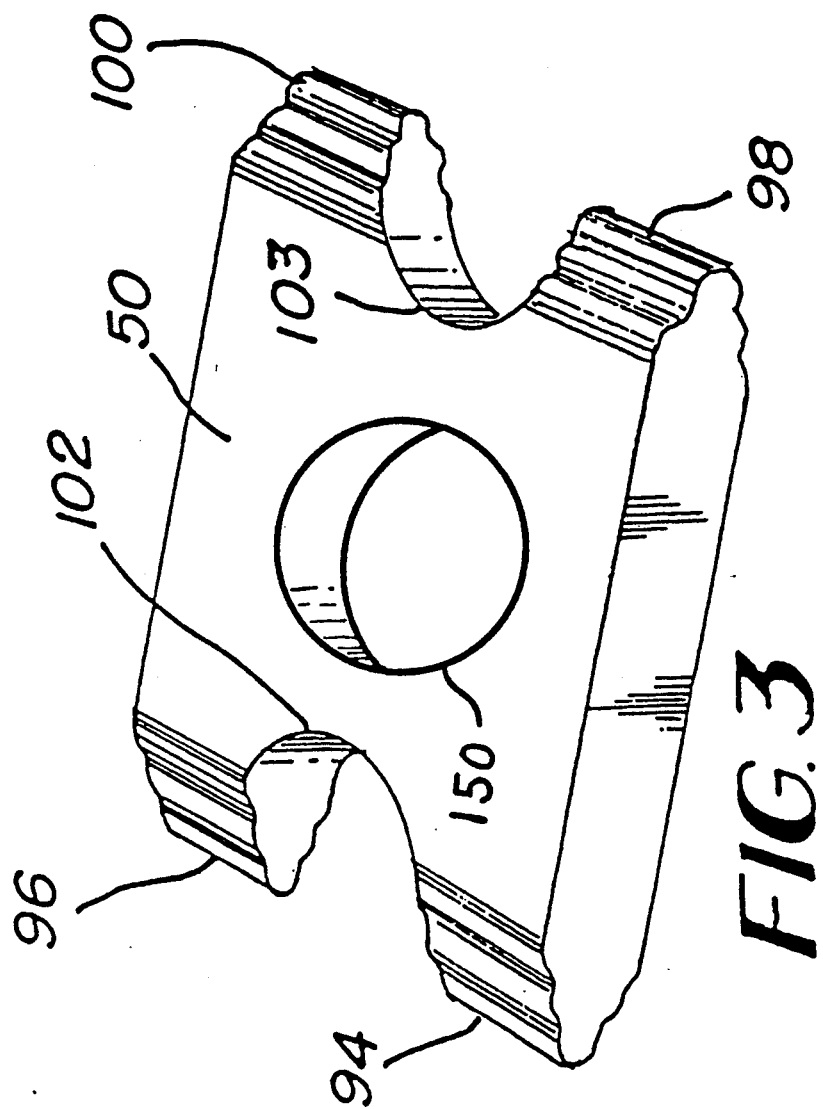
FIG. 3 is a perspective view illustrative of an H-plate type interface member which is engageable with the rollers of the gripper fingers shown in FIG. 1.
Figure 10:
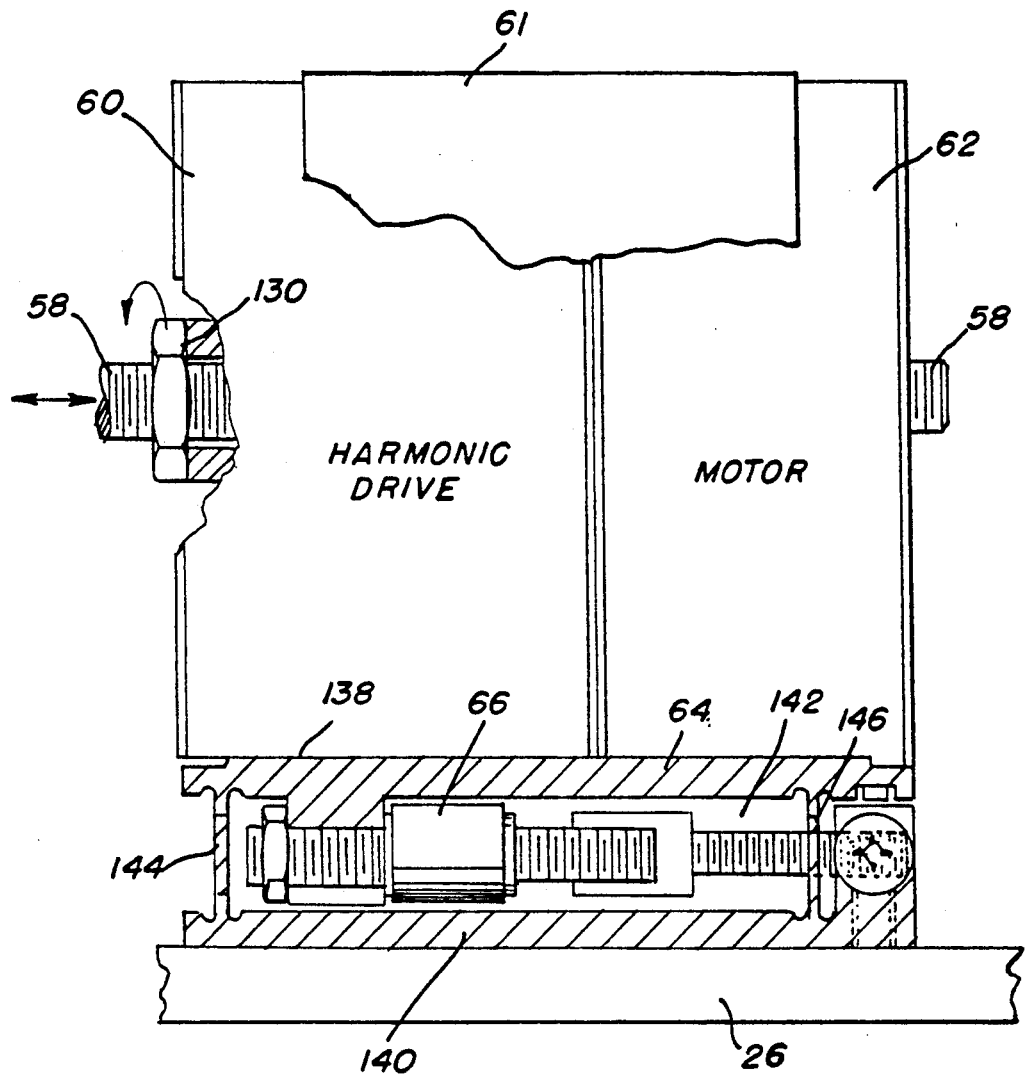
FIG. 10 is a partial cross-sectional view illustrative of the details of the strain gauge motor mount for measuring the force exerted by the gripper fingers shown in FIG. 1.
Figure 11:
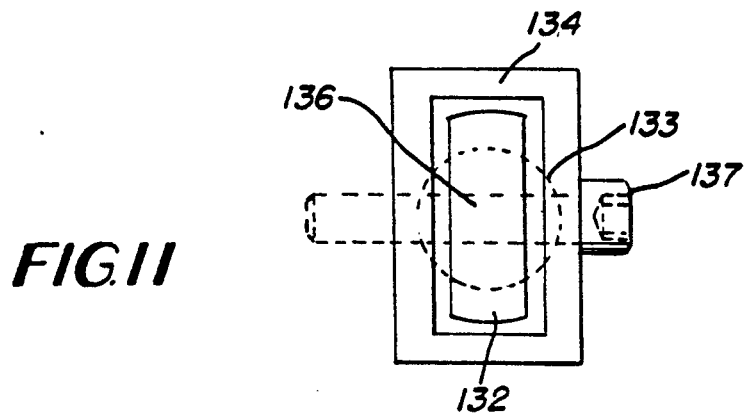
FIG. 11 is a partial end planar view illustrative of the means for coupling the drive screw shown in FIG. 1 to the top rail gripper finger.

Attached to opposite ends of the top and bottom rails 32 and 34 are a pair of outwardly projecting finger members 46 and 48 which are adapted to move toward and away from each other to grip an H plate interface member 50 shown in FIG. 3 and to which is attached a workpiece as shown in phantom view by reference numeral 52 of FIG. 4 and which is to be operated on by a retractable tool mechanism 54 containing a rotatable tool 56. Movement of the gripper fingers 46 and 48 is controlled by a drive screw member 58 connected between the lower end of the finger member 46 attached to the upper rail 32 and a harmonic drive gear reduction mechanism 60 and electric motor 62 which are secured to a motor mount and base structure 64 affixed to the baseplate 26 by a housing 61. The motor mount 64 also includes a load cell 66 as shown in FIG. 10 for measuring the gripping reaction forces on the finger elements 46 and 48.

Figure 2:
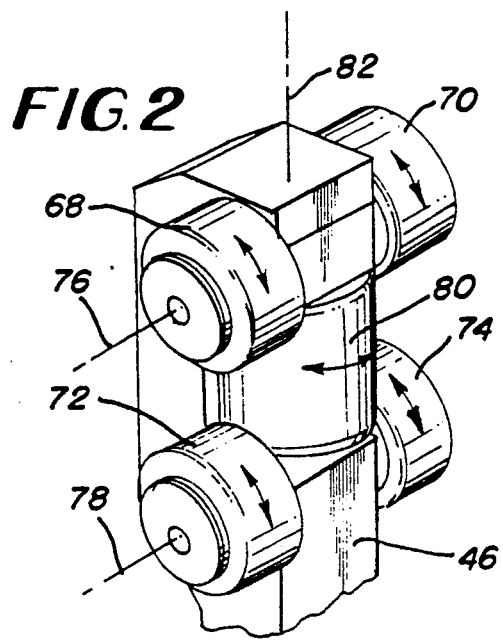
FIG. 2 is a partial perspective view being illustrative of the roller members located at the upper end of the gripper fingers.

Referring now to FIG. 2, shown thereat are the details of the gripper elements located at the outer end of the fingers 46 and 48. As shown, the end of the finger 46 includes first and second pairs of rollers 68, 70 and 72, 74 which are respectively aligned on a pair of parallel horizontal axes 76 and 78. A fifth roller 80 is located between the rollers 68, 70 and 72, 74 at mutually right angles thereto and is aligned along a vertical axis 82 which intersects the parallel axes 76 and 78. In a like manner, the opposite finger 48 includes the same arrangement which is shown in FIG. 1; however, only rollers 84, 88 and 92 are shown consisting of an upper pair of horizontal rollers 84, 86, a lower pair of rollers 88 and 90, and an intermediate orthogonal vertical roller 92. The upper pair of rollers 84 and 86 are depicted in the top planar view of FIG. 6.

The configuration of the roller members located at the ends of the two fingers 46 and 48 are operative to automatically position and grip the opposite ends of the H plate type interface member 50 shown in FIG. 3. Referring now briefly to FIG. 3, the interface plate 50 is comprised of beveled bifurcated ends of reduced width including pairs of end portions 94, 96 and 98, 100, between which are located two generally circular recesses 102 and 103. An approximately 2" diameter tapered hole 150 is located at the center of interface plate 50.

In operation, as the two finger elements 46 and 48 are moved inwardly toward one another, the roller members at the ends thereof will contact the end portions 94, 96, and 98, 100, and automatically guide the plate 50 into position such that the recesses 102 and 103 straddle the two intermediate vertical rollers 80 and 92 as shown in FIG. 4. This permits the retractable tool driver 54, which includes a plurality of telescoping sections 104, to be extended through hole 150 and position the tool 56, which may be, for example, a screw driver or a nut runner, at the workpiece 52 which is attached to the plate 50. As shown, the tool 56 comprises an allen wrench or key. Because hole 150 has a taper towards one end, retractable tool driver 54 is guided towards workpiece 52.

This now leads to consideration of the principal feature of the invention which is directed at the details of the way in which the two rails, the top rail 32 and the bottom rail 34, are supported and driven to control the position the two fingers 46 and 48.

As shown in FIGS. 5 through 9 and more particularly in FIG. 7, the two rails 32 and 34 are located between the two bearings 38 and 42, while the other two bearings 40 and 44 are located one on top of the upper rail 32 and the other below the lower rail 34. Each rail 32 and 34 is accordingly supported by three intermediate bearings forming two stable triangles within the housing 36 which also acts as a housing to hold the various parts together.

Further as shown, the upper rail 32 includes a set of rack gear teeth 106 which engage the teeth 108 of an adjoining pinion gear 110 which is aligned along the axis 112, being mounted on a shaft 113 and supported by three sets of roller bearings 115, 117 and 118 and which might be referred to as a vertical axis parallel to the axis 82 shown in FIG. 2 for the roller member 80. The pinion gear 110 is thus driven by translational motion of the upper rail 32 which is imparted by a linear motion of the drive screw 58 (FIG. 1) as will be shown.

Figure 8:
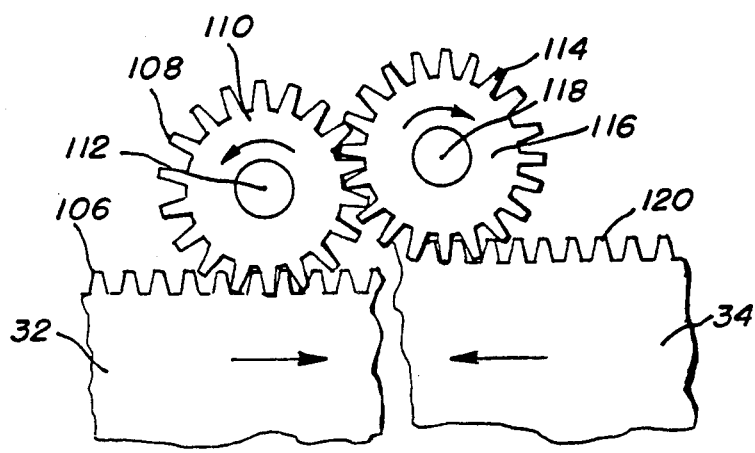
FIG. 8 is a partial schematic view illustrative of the rack and pinion gear assembly included in the embodiment shown in FIG. 1.
Figure 9:
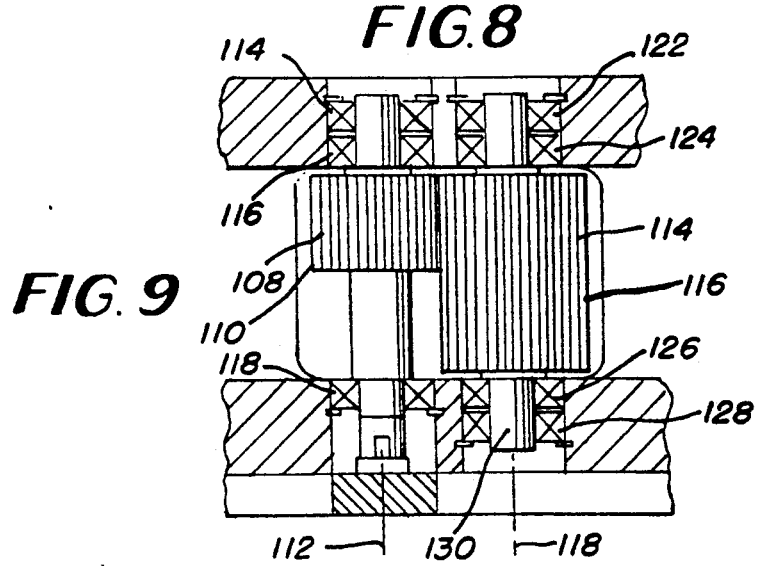
FIG. 9 is a sectional view taken along the lines 9—9 of FIG. 6 and being further illustrative of the rack and gear pinion gear assembly for moving the top and bottom rails.

The pinion gear 110 engages the teeth 114 of a second pinion gear 116 which is aligned along a second vertical axis 118 adjacent the axis 112 as shown in FIG. 9. The gear teeth 114 extend downwardly to engage the gear teeth 120 of a rack formed on the side of the lower rail 34 as depicted in FIG. 8. The elongated pinion gear 116, moreover, is supported by two pairs of bearings 122, 124 and 126, 128 (FIG. 9). When desirable, the single elongated pinion gear 116 can be implemented by two smaller pinion gears mounted on the shaft 130 with one of the gears engaging the pinion 110, while the other engages the rack teeth 120 of the lower rail 34.

As noted above, the movement of the fingers 46 and 48 as controlled by operation of the two rails 32 and 34 in mutually opposite directions is provided by the drive screw 58. The drive screw 58 as shown in FIG. 6, for example, is operated by a motor driven harmonic drive gear reduction mechanism 60 which rotates a nut 130, shown schematically in FIG. 10. A harmonic drive is a well known device and typically consists of a wave generator member coupled to a shaft, a flexible cup-type spline and a circular spline which is attached to a motion coupling element. In the instant invention, the harmonic drive is preferably comprised of a pancake type harmonic drive and includes a dynamic circular spline, not shown, which is used to transfer its rotary output to the nut 130. The pancake type harmonic drive 60 is furthermore hollow so that the drive screw 58 can pass therethrough. Rotation of the nut 130 causes the drive screw to exert a pulling or pushing force on the rails by virtue of its connection to the upper rail 32. As shown in FIG. 10, a motor 62 provides rotary input to the harmonic drive 60. The motor 62 typically comprises a hollow brushless DC motor so that the drive screw 58 can also pass axially therethrough.

The far end of the drive screw 58 terminates in a ball and socket joint including a flattened socket member 132 and a ball 133 which fits into an open ended rectangular end piece 134 secured to a rib section 135 projecting from the lower end of the finger 46 as shown in FIGS. 1 and 5. The ball 133 includes a through hole so as to accommodate a shoulder bolt 136 which fastens the drive screw to the end piece 134. This type of coupling prevents the drive screw 58 from being turned and thus the rotating nut acts to linearly translate the drive screw 58 in and out of the harmonic drive 60 and motor 62. The shoulder bolt 136 is threaded such that it can be manually removed, when required, by inserting an allen screw, for example, at the head end 137 for disconnecting the drive screw from the rail 32 and thus releasing the fingers 46 and 48.

The manner in which the drive screw 58 is attached to the rail 32 via the end piece 134 insures sufficient energy is being provided to the screw 58 to break it free should it become frozen. Sufficient backlash is built into the attachment point between the drive screw 58 and the end piece 134 so that the socket end of the screw can rotate a few degrees on the ball 132 before encountering a stop. This allows the motor 62 on the input side of the gear reduction harmonic drive 60 to make one and one half free rotations before experiencing any load. In this fashion, sufficient kinetic energy can be built up to overcome large sticking forces between the drive screw 58 and the nut 130.

The gripping force exerted by the two fingers 46 and 48 is sensed by the load cell 66 as shown in FIG. 10. The motor mount 64 includes top and bottom wall sections 138 and 140 accompanied by a hollowed mid section 142 which accommodates the load cell 66 and a pair of transverse relatively thin blade type connecting elements 144 and 146 between the wall sections 138 and 140. The friction between the drive screw 58 and the drive nut 130 is all in rotation. Accordingly, any pulling force is exerted on the blade elements 144 and 146 along the axis of the drive screw. The blade elements 144 and 146 are stiff in all other axes and rotations. With the load cell coupled between the upper and lower wall sections 138 and 140 of the motor mount 64, it can measure the force that the drive motor 62 is exerting on the base and which is a direct function of the gripping force exerted by the fingers 46 and 48 through the harmonic drive gear reducer 60 and the drive screw.

With respect to the rotary tool mechanism 54 as shown in FIG. 1, as noted above, it includes one or more telescoping sections 104 as well as the tool tip itself 56 which may be, for example, an allen key. The telescoping sections 104 are spring loaded and include keyway grooves, not shown, which permit the tool tip 56 to move axially while transmitting torque. When the tool tip 56 is inserted into an allen head, for example, on the workpiece 52 as shown in FIG. 4, the spring loaded sections 104 provide compliance in the axial direction and press the tool 56 into the head. The final keyway where the tool tip is attached to the first section has a loose fit to allow the tool tip a small amount of lateral compliance, which is important for robotic applications. This compliance is not necessary, however, for operation of the tool 56 itself. When the rotary tool is no longer required, the telescoping sections 104 are axially compressed causing all the sections to collapse until the rear end of the tool tip shaft engages a catch, not shown, at the base of the tool. The catch keeps the tool 56 fully retracted until it is released. A release is achieved by activating the tool drive motor 30, whereupon the spring loaded telescoping sections 104 then extend to its full length.

Thus what has been shown is an improved workpiece gripper mechanism for robotically grasping objects in a zero gravity environment.

Having thus shown and described what is at present considered to be the preferred embodiment of the invention, it should be noted that the same has been made by way of illustration and not limitation. Accordingly, all modifications, alterations and changes coming within the spirit and scope of the invention are herein meant to be included.

I claim:

1. Split-rail robotic gripper apparatus, comprising:
   a base;
   a first and a second elongated rail located on said base and being movable in mutually opposite directions and supported by four crossed-roller bearings;
   housing means for holding said rails against said bearings;
   two of said bearings being located in parallel between the rails, the other two of said bearings being located between said housing means and said first and second rails, respectively, whereby each said rail is supported by three of said bearings in a triangular configuration;
   respective outwardly extending gripper finger means attached to said first and second rails for grasping and holding an object to be gripped;

rack and pinion gear means coupling said rails together for providing simultaneous linear movement in mutually opposite directions when driven; and drive motor means coupled to said first elongated rail for driving said rails and gripper finger means in and out of engagement with said object to be gripped.

2. The gripper apparatus of claim 1 wherein said rack and pinion gear means comprises, first rack gear means on said first rail, first pinion gear means engaging said first rack gear means, second rack gear means on said second rail, and second pinion gear means engaging both said first pinion gear means and said second rack means.

3. The gripper apparatus of claim 2 wherein said first and second rack gear means are respectively located on the sides of said first and second rails and wherein said first and second pinion gear means are located adjacent the sides of said first and second rack means on said rails for engaging said first and second rails.

4. The gripper apparatus of claim 3 wherein said first rail comprises a top rail of two generally horizontal rails, and wherein said second rail comprises a bottom rail of said two rails.

5. The gripper apparatus of claim 3 wherein said drive motor means coupled to said first elongated rail includes gear reduction means coupled to said drive motor means.

6. The gripper apparatus of claim 5 wherein said drive motor means coupled to said first elongated rail further includes a captive nut rotatably driven by said gear reduction means and a non-rotatable drive screw threaded onto said captive nut toward one end and coupled at the other end to said first rail.

7. The gripper apparatus of claim 6 wherein the other end of said drive screw is coupled to said first rail adjacent the gripper finger means attached to said first rail.

8. The gripper apparatus of claim 7 and additionally including ball and socket coupling means coupling said drive screw to said first rail.

9. The gripper apparatus of claim 5 wherein said gear reduction means comprises a harmonic gear reduction drive.

10. The gripper apparatus of claim 2 wherein each said gripper finger means includes roller means at the outward ends thereof for engaging an interface plate on said object to be gripped.

11. The gripper apparatus of claim 10 wherein said roller means comprises a first and a second pair of spaced apart roller members respectively aligned along first and second parallel axes and a fifth roller located between said pairs of rollers and aligned along a third axis orthogonal to said first and second axis.

12. The gripper apparatus of claim 11 wherein said third axis intersects said first and second axes.

13. The gripper apparatus of claim 2 and additionally including a drive motor mount located between said base and said drive motor means and including a load cell thereon for measuring the gripping force exerted by said gripper finger means.

14. The gripper apparatus of claim 6 and additionally including mounting means located between said gear reduction means coupled to said drive motor means and said baseplate means, said mounting means further including a load cell mounted thereon for sensing the force exerted by said drive motor on said gripper finger means via said drive screw.

15. The gripper apparatus of claim 14 wherein said mounting means comprises top and bottom wall sections separated by at least one blade type element which flexes in the direction along a longitudinal axis of said drive screw, and wherein said load cell is connected between said blade type element and one of said wall sections.

16. The gripper apparatus of claim 15 wherein said top and bottom wall sections are separated by two spaced apart blade type elements.

17. The gripper apparatus of claim 2 and additionally including tool driver means located on said base between said gripper finger means, and another drive motor means coupled to said tool drive means for supplying power to said tool driver means.

18. The gripper apparatus of claim 17 wherein said tool driver means includes at least one outwardly extending telescoping section.

19. The gripper apparatus of claim 18 and additionally including a detachable tool on said tool driver means for engaging said object to be gripped.

* * * * *